United States Patent [19]

Tchakgarian

[11] E Re. 29,462

[45] Reissued Nov. 1, 1977

[54] LUMINOUS OUTDOOR SIGN BOARD RESISTANT TO INCLEMENT WEATHER

[76] Inventor: René Vérazin Tchakgarian, 19, Avenue Charles de Gaulle, Autun (Saone et Loire), France

[21] Appl. No.: 708,593

[22] Filed: July 26, 1976

Related U.S. Patent Documents

Reissue of:

[64] Patent No.: 3,837,105
Issued: Sept. 24, 1974
Appl. No.: 331,334
Filed: Feb. 9, 1973

[30] Foreign Application Priority Data

Nov. 2, 1972 France ..... 72.38851

[51] Int. Cl.[2] ..... G09F 13/04

[52] U.S. Cl. ..... 40/130 R; 40/125 R; 40/125 N; 40/138

[58] Field of Search ..... 40/138, 125 R, 125 H, 40/125 N, 140, 130 R; 240/1.2

[56] References Cited

U.S. PATENT DOCUMENTS

| | | | |
|---|---|---|---|
| 1,009,477 | 11/1911 | Conly | 40/138 |
| 1,150,444 | 8/1915 | Martter | 40/125 R |
| 2,075,764 | 3/1937 | Marten | 40/130 R |
| 2,123,361 | 7/1938 | Hollis | 40/130 R X |
| 3,768,187 | 10/1973 | Dunne | 40/140 X |

*Primary Examiner*—John F. Pitrelli
*Attorney, Agent, or Firm*—Parmelee, Johnson & Bollinger

[57] ABSTRACT

Luminous board designed specially to resist inclement weather and in particular strong gusts of wind, this board being constituted by an open-work framework in the form of a case of which at least one longitudinal wall is formed by slats illuminated from inside the case, said framework being of the open-work type and the support slats being contiguous in a vertical plane to form a continuous wall preventing the diffusion of luminous rays toward the exterior, the slats in addition being spaced out laterally with respect to one another to form between them communication interstices allowing the wind and rain water to pass through the board, both horizontally and vertically.

6 Claims, 2 Drawing Figures

LUMINOUS OUTDOOR SIGN BOARD RESISTANT TO INCLEMENT WEATHER

Matter enclosed in heavy brackets [ ] appears in the original patent but forms no part of this reissue specification; matter printed in italics indicates the additions made by reissue.

The invention relates to a luminous board intended for road signs or for spreading publicity messages, the board being designed specially for out-of-door use without inclement weather particularly wind, having any influence whatsoever on its life.

The luminous boards called "outdoor" boards must satisfy two precise requirements, on one hand they must resist inclement weather and in particular sudden wind blasts due to squalls, and on the other be provided with a lighting means which is proof against direct light projection, while at the same time giving good day and night visibility.

To satisfy the first of these two criteria, massive luminous boards have been proposed with their plinth held in concrete plates with a weight of the order of several tens of cubic meters or even hundreds of cubic meters. Apart from the considerable investment which these structures entail, these reinforced boards are often "unrooted" by sudden dominating wind blasts or deteriorated by rain water.

In addition, the water-proof sealing provided by certain manufacturers sometimes cause the board to explode when the electric light is switched on. It was then decided to introduce a screen with holes into the board, so that they could "breathe" without any insects penetrating into the interior. But, insects laid eggs near the sources of light so that their offspring found themselves shut in the cases.

To overcome this first series of disadvantages, the board was made from a framework or case of which two longitudinal sides were covered with walls consisting of independent slats supporting the letters of the message. In these known constructions, the slats, instead of being spaced out to allow the wind to pass through the board, partially overlapped one [anotheer,] *another,* so that the walls presented a considerable surface for the wind to "catch."

In addition, the framework was hermetically sealed and therefore did not allow the wind to pass freely through the board. Lastly, the means of lighting used in these boards, although they were located inside the case and unwanted reflections were eliminated, they were not satisfactory because the illumination was not effective, because the inscription on the board was not illuminated homogeneously.

Boards were then designed with the slats open to all winds, driving back the water as easily as it entered. However, once again, these constructions exhibited some disadvantages, even though they had overcome certain of the previous difficulties, as regards in particular those relating to resistance to wind, the reduction of the bulk of the plates, etc... On the other hand the slats, being made of transluscent plastic material, considerable problems were encountered resulting from the expansion of the plastic material with respect to the metal body due to variations of temperature. In particular, when large surfaces or large bands were concerned, the expansion of the sheets was such that the expansion joints became large and ugly obstacles. Nevertheless, it is within the concept of slat boards that the subject of this invention falls, that is, it relates to slats that are permeable and weather-proof.

For the best means of resisting wind is not necessarily to oppose it with a rigid obstacle placed in its path on which it can catch, but on the contrary to cooperate with it by allowing it to pass freely through the board.

This design, however, encounters another series of problems namely, that the permeability of the board should not militate against the principal object of the board: the [proviion] *provision* of information during the day and at night. It was necessary therefore that the interstices provided between the slats (to allow the wind and rain water to pass through) allowed the luminous rays to pass to the exterior without bothering the user of diminishing luminosity.

It is to over come these various problems that particular attention was paid to the orientation of the slats.

The invention therefore relates to a luminous board designed specially to resist inclement weather and in particular strong gusts of wind, this board being constituted by an open-work framework in the form of a case of which at least one longitudinal wall is formed by slats which constitute the screen for letters or signs forming the message on the board, these slats being illuminated from the interior of the case, said board being characterized in that the framework is of the open-work type and that the support slats are contiguous in a vertical plane to form a continuous wall preventing the diffusion of luminous rays toward the exterior, these slats being in addition spaced out laterally with respect to one another to form communication interstices allowing the wind and rain water to pass freely through the board both horizontally and vertically.

This design enables considerable lighter boards to be made which are unaffected by inclement weather in so far as they do not oppose it. In addition, these slats, which are inclined and not joined, are arranged in such a manner that while allowing rain water to pass freely, they eliminate, for the benefit of the user, the unwanted reflections while at the same time giving excellent day time legibility by improving the luminosity.

Thus these slats, although staggered, give the impression, when viewed from the front while standing back that they are completely joined, which prevents the luminous rays from the lighting means to filter through the slats and bother the users.

According to another characteristic feature of the invention, the support slats are fixed to the end of threaded or injected rods, slightly bent, extending radially on both sides of the median uprights connecting the two upper and lower profiled sections supporting the frame of the case.

According to another characteristic feature of the invention, the slats are made of a transluscent plastic material such as methacrylate and are fixed, with the aid of threaded rods, to various points along their length.

A luminous board, according to the invention, is illustrated by way of non-limitative example in the accompanying figures in which.

Figure 1:
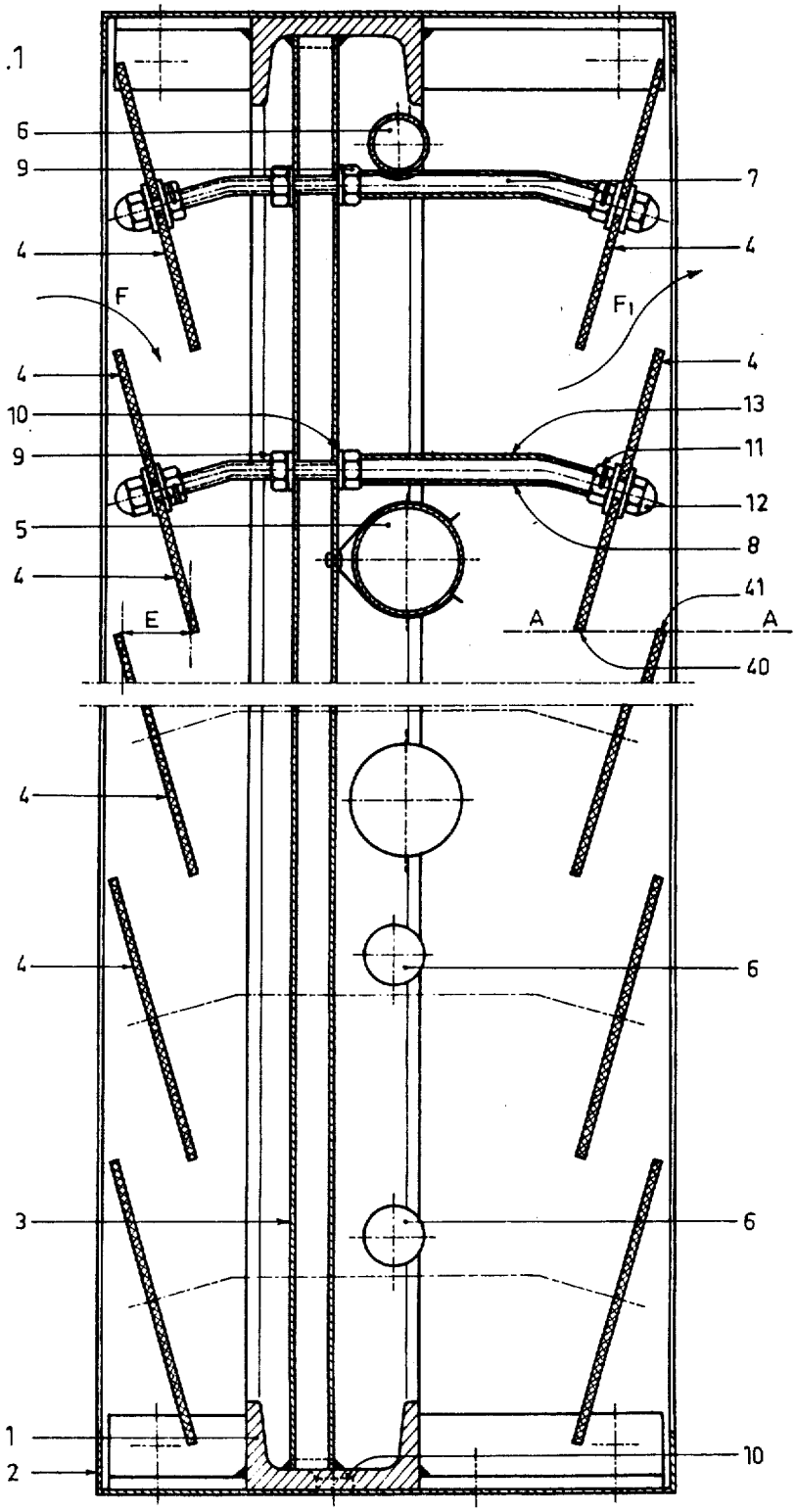
FIG. 1 is a cross-sectional view of the board according to the invention.

The luminous board according to the invention consists essentially of a belt of a parallelepipedic case of which the two useful sides, on which the letters of the publicity message or signal are displayed, are constituted, in the known way, by inclined slats.

The framework, in the form of a case, consists essentially of metal profiled sections 1 with a section in the form of a U, the wing of these profiled sections being directed toward the interior of the case. These profiled sections serve as fittings for the frame 2 extending along the entire perimeter of the case. The lower and the upper profiled sections are connected to one another by the uprights 3 welded, by their two ends, onto the internal face 10 of the profiled sections 1. These uprights are perpendicular to the profiled sections 1 and extend along the entire height of the case, so as to serve as assembly supports for the inclined slats forming the two longitudinal walls of the case. These slats extend over the entire height of the case and are inclined to the same angle so that they are parallel. The fixation and the position of these slats is determining since it is they that will allow the winds, rain or snow to pass freely through the case, while allowing the assembly of slats to be illuminated homogeneously without the formation of any unwanted reflection.

To overcome this problem, the slats are contiguous in a vertical plane, that is to say, the lower end 40 of one passes along the same horizontal plane as the upper end 41 of the other (mixed broken lines AA). This particular arrangement of the slats enables a continuous surface to be obtained in the space so that, when standing back, the user obtains the impression that he is facing a plane surface. In this way, the luminous rays emitted by the fluorescent tubes 5 or the neon tubes 6 cannot pass through the slats 4.

On the other hand, the board assembly is permeable to wind, snow and rain on account of the fact that between contiguous slats that are spaces E which are sufficiently large to allow them to pass through the case (arrow F).

As these spaces E are both sides of the case and there is no internal obstacle opposing the passage of wind through the case, the wind is free to enter by one of the sides of the case and leave it by the other side (arrow F1).

However, in the case of a unit with a simple slat side, the base can be open or closed by a screen or perforated plate.

The inclined slats 4 are fixed with the aid of threaded rods 7, which are slightly bent at 8, said rods being supported by the uprights 3. The rods are immobilised inside the case with the aid of locking nuts 9 and washers 10 on both sides of the uprights 3. The final securing of the inclined slats 4 is effected with the aid of a stop nut 11 and a blind nut 12, in between which each slat is held freely. Each rod, when it is threaded, is covered with an insulating sheath 13 because the rods serve not only to fix the inclined slats 4 in position, but also as supports for the neon tubes 6 (FIG. 1).

The sources of light are coupled to each pair of slats so that there is at least one neon or fluorescent tube between opposite slats, in order that all the slats be illuminated with the same intensity, which results in the letters fixed on the slats being illuminated uniformly over their whole surface.

Figure 2:
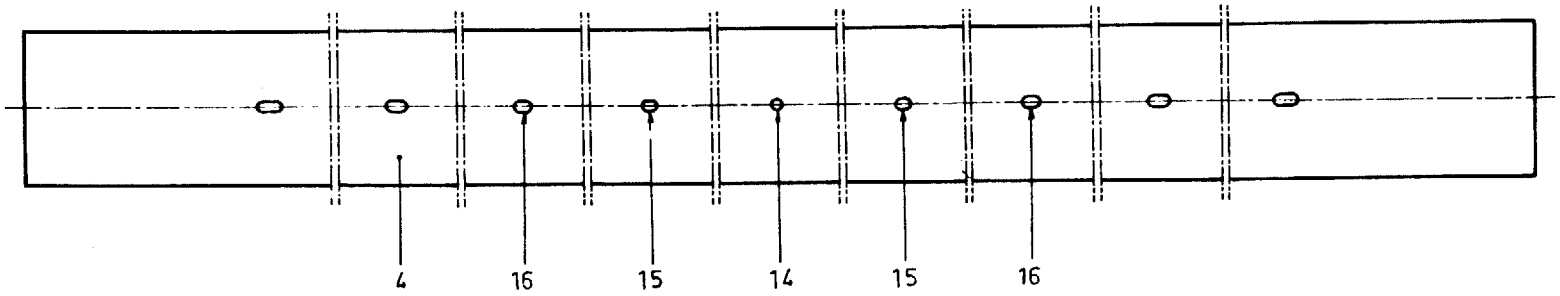
FIG. 2 is a plan view of one of the inclined slats.

The slats that extend over the whole of the length of the case are fixed at various points of their axis with the aid of threaded rods 7 supported by the uprights 3. However, in order to prevent any expansion resulting from variations in temperatures encountered in winter and in the summer, each slat has the particularity (FIG. 2) of having in its center a circular securing orifice 14, while the other orifices located on both sides of this orifice, gradually elongate up to the two ends of the slat; it is thus that the orifices 15 are smaller in length than the orifices 16 etc... Thus the expansions are autocompensated.

The plates are pierced in the workshop at a temperature of 15° C which allows an outdoor expansion ranging from −35° C to +65° C.

This concept of a sign board thus enables extremely light structures to be obtained, which are aerated and self-washing by rain water. In addition, the simplicity of the components used for the construction of these boards makes them highly competitive.

It is obvious that the invention is not limited to the example of its embodiment herein above described and illustrated and on the basis of which, other methods and modes of its embodiment can be envisaged without departing from the scope of the invention.

What is claimed is:

1. A luminous outdoor sign board adapted to resist inclement weather comprising:

a framework in the form of a case defining a pair of opposed open sides, support means within the case including a plurality of rods extending toward said opposed open sides of the case, a plurality of parallel translucent slats, each slat being supported by attachment to a plurality of said rods, the attachment between each slat and its support rods being located at spaced points along the centerline axis of the slat for allowing free expansion of the edges of the slats, said parallel translucent slats being positioned in the open sides of said case with the edges of said slats when seen in the vertical plane being continuous, so that when standing back the viewer obtains the impression that he is facing a plane surface, said slats being inclined in the same direction to form between them lateral interstices extending over their entire length for allowing the wind and rain water to pass freely through the sign board both horizontally and vertically for making the sign board aerated and self-washing, letters forming a message being fixed on the slats, and lighting means located in the case illuminating from the inside said translucent slats and said letters on the slats.

2. A luminous outdoor sign board adapted to resist inclement [wather] *weather* as claimed in claim 1, in which:

said parallel translucent slats are arranged in opposed pairs positioned respectively in the opposed open sides of said case, said opposed pairs of slats are supported by the same rods at opposite ends thereof, and said lighting means are a plurality of light tubes positioned between the opposed pairs of translucent slats and extending parallel with the slats for illuminating them both from the inside, whereby said slats are illuminated uniformly along their length.

3. A luminous outdoor sign board adapted to resist inclement weather as claimed in claim 2, in which:

said rods are each covered by insulation sheaths, and said light tubes are neon tubes supported by said rods and insulated from said rods by said insulation sheaths.

4. A luminous outdoor sign board adapted to resist inclement weather as claimed in claim 1, in which:

the opposite end portions of said rods are bent slightly and are threaded, said slats have holes therein on the centerline axis and are mounted on the bent ends of said rods, said slats being held perpendicular to the adjacent bent end portions of said rods by stop nuts on said threaded end portions inside of said slats and blind nuts on said threaded end portion outside of said slats, whereby said bent end portions of said rods serve to fix said inclined slats in their inclined positions.

5. A luminous outdoor sign board resistant to inclement weather comprising:

a framework in the form of a case, a plurality of parallel translucent slats constituting at least one of the longitudinal walls of the sign board, the edges of [sid] *said* slats when seen in a vertical plane being continuous, said slats being inclined in the same direction to provide between them lateral interstices extending over their entire length, letters forming a message fixed on said slats, lighting means located in the case illuminating from the inside said translucent slats and the letters on said slats, support means in said case including a plurality of threaded rods extending to said slats, said slats being made of a translucent plastic material and having a plurality of orifices therein at various points along their length for attachment to said threaded rods, one of the orifices being circular and centrally located in each slat, while other orifices located on both sides of said circular one are gradually elongated from one orifice to the other to the ends of the slats for allowing autocompensation expansions of the order from −35° C to +65° C.

6. A luminous outdoor sign board resistant to inclement weather, as claimed in claim 5, in which:

said attachment orifices are pierced in the slats at a temperature of 15° C.

* * * * *